Aug. 16, 1966  S. PURE  3,267,420
DEPTH MEASURING APPARATUS

Filed Feb. 27, 1964  2 Sheets-Sheet 1

INVENTOR.
SAMUEL PURE
BY
[signature]
ATTORNEY

Aug. 16, 1966 S. PURE 3,267,420
DEPTH MEASURING APPARATUS
Filed Feb. 27, 1964 2 Sheets-Sheet 2
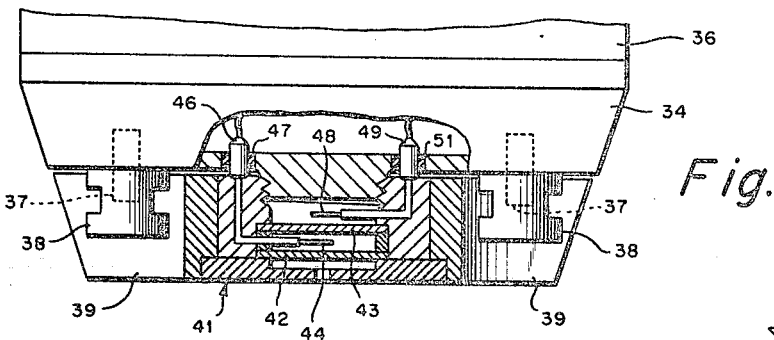
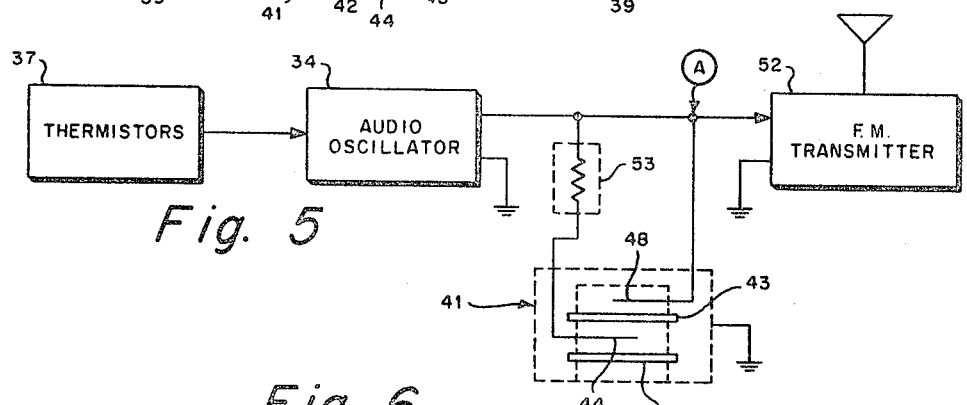
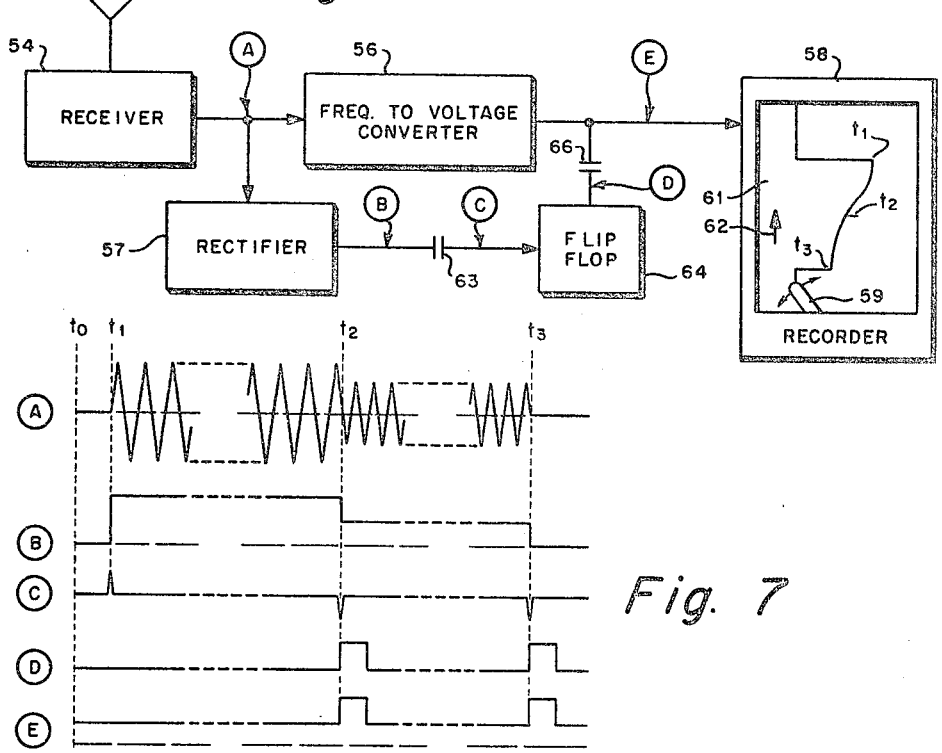

United States Patent Office 3,267,420
Patented August 16, 1966

3,267,420
DEPTH MEASURING APPARATUS
Samuel Pure, Rydal, Pa., assignor to the United States of America as represented by the Secretary of the Navy
Filed Feb. 27, 1964, Ser. No. 347,967
10 Claims. (Cl. 340—5)

The invention described herein may be manufactured and used by or for the Government of the United States of America for governmental purposes without the payment of any royalties thereon or therefor.

The present invention relates to hydrostatic pressure measuring and indicating apparatus, and more particularly to an aircraft-launched bathythermograph apparatus utilizing a descending probe capable of synoptic depth-versus-temperature measurements in a body of water.

Sound refraction and propagation velocity through water are, inter alia, functions of temperature and salinity which, in turn, vary with depth. For anti-submarine warfare, an aircraft-launched bathythermograph has been developed which transmits temperature information as the temperature-sensing probe thereof descends in the ocean. The information may be conducted through a cable to a flotation device and then radio transmitted to a remote receiver, or acoustically transmitted to a listening sonobuoy and then radio transmitted to the remote receiver. The temperature-sensing probe is usually lowered at a controlled rate from a flotation device, or released to sink freely under its own weight. In order to ascertain a depth-versus-temperature relationship with either type of probe, it was necessary either to assume a time when descent commenced and then a constant descent rate, or provide means for measuring and transmitting the hydrostatic pressure during descent. The former often leads to unreliable and inaccurate results, and the latter greatly multiplies the complexity, size and cost because of the additional measuring and transmission facilities, known in the prior art, which are required.

Accordingly, it is an object of the present invention to provide a novel depth measuring probe which is adaptable for a cable-lowered or free-sinking device, and in which the time of descent can be measured and transmitted with only minor modifications to the device.

Another object of the invention is to provide a simplified and improved water probe which is capable of generating a distinct acoustical pulse at any preselected depth, and in which the pulse can be repeated at a plurality of selected depths along the descent path of the probe.

Still another object of the invention is to provide an improved sinking probe capable of simultaneously measuring and transmitting synoptic measurements of an ambient condition and depth during descent in which the transmission is discernibly modified at preselected depths during descent of the probe.

A still further object of the present invention is to provide a depth measuring probe which is extremely simple and inexpensive to manufacture, which is rugged and reliable for its intended purposes, and which is small and compact for use in aircraft-launched bathythermographs.

Various other objects and advantages will appear in the following description of several embodiments of the invention, and the most novel features will be particularly pointed out hereinafter in connection with the appended claims.

In the drawing:

FIG. 1 represents a longitudinal view of one embodiment of the present invention with a portion cut away to show some of the details therein;

FIG. 2 diagrammatically represents an end view of the inventive embodiment of FIG. 1 taken from below;

FIG. 3 diagrammatically represents a cross-sectional view of the lower end of the inventive embodiment of FIG. 1 as taken along the line 3—3 of FIG. 2;

FIG. 4 diagrammatically represents, in cross-sectional view like FIG. 3, another embodiment of the present invention;

FIG. 5 is a schematic illustration and block diagram of the inventive embodiment in FIG. 4;

FIG. 6 is another block diagram of the inventive embodiment in FIG. 4; and

FIG. 7 is a graphical representation of the signal waveforms during typical operation of the inventive embodiment in FIGS. 4, 5 and 6.

Figure 1:
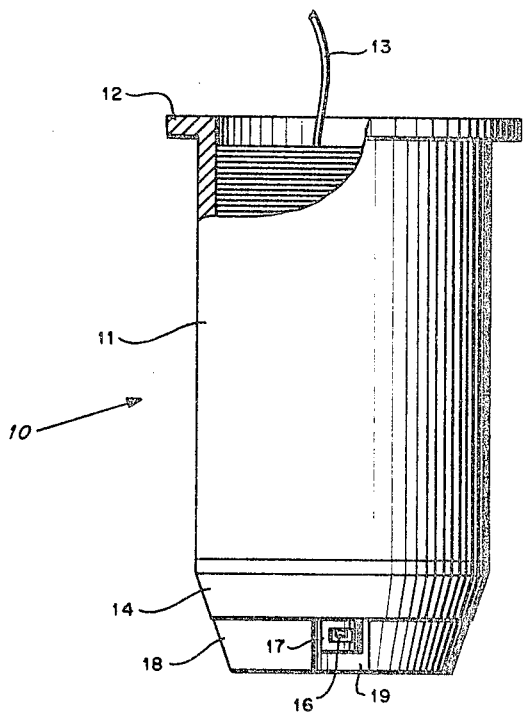
Figure 2:
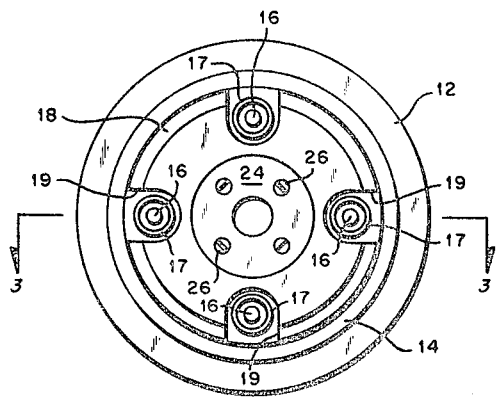
Figure 3:
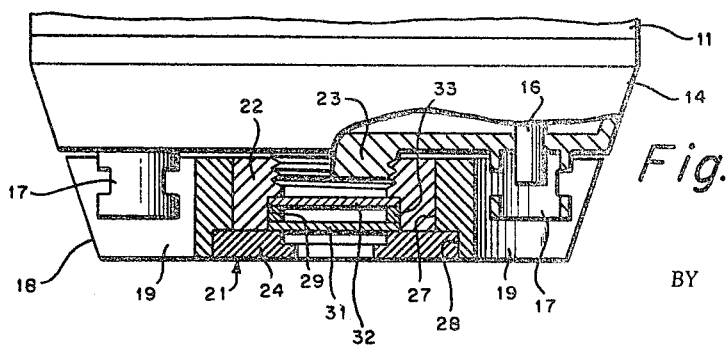

Referring now to the embodiment of the invention illustrated in FIGS. 1, 2 and 3, a bathythermograph probe, indicated generally by the numeral 10, includes a cylindrical cannister 11 with a flange 12 formed at one end to be releasably secured to a flotation device, not shown, prior to entering a body of water. The flotation device contains a radio transmitter whose input is connected to a very long cable 13, for example 1000 feet, which is level wound in the cannister 11 for smooth payout through the upper end of the cannister 11 as the probe 10 descends in the water. The other end of the cable 13 is connected to the output of a sealed audio oscillator 14. As best seen in FIGS. 2 and 3, the housing of the oscillator 14 supports four thermistors 16 within respective cylindrical grills 17. Openings around each grill 17 permit free flow of water past the thermistors 16 during descent, while providing protection to the thermistors 16 against physical damage.

Positive payout of the cable 13 as the probe 10 descends in the water is assured by the addition of a generally circular weight 18 coaxially secured in a manner described below to the lower side of the oscillator 14. Four radial grooves 19 at respective grills 17 and opened toward the circumference of the weight 18 provide a water access through the grills 17 to the thermistors 16.

The weight 18 is fixed against the lower side of the oscillator 14 by a hydrostatic unit indicated generally by the numeral 21. The housing of the unit 21 comprises a cylindrical sleeve 22 threadingly engaged at one end to a boss 23 projecting from the oscillator 14, and an annular flange 24 fastened on the other end of the sleeve 22 by a plurality of machine screws 26. The weight 18 includes a coaxial cylindrical opening 27 and annular recess 28 therein for slidingly receiving the unit 21 as the latter is threaded onto the boss 23. The weight 18 is thereby longitudinally fixed by the abutment of the flat surfaces of the flange 24 and the recess 28 when the sleeve 21 is fully secured on the boss 23. It is contemplated, of course, that the unit 21 may be secured at other probe locations in any convenient manner without materially departing from the present invention.

The sleeve 22 also includes an annular recess 29 at the flange-end for receiving two rupturable disks 31 and 32 separated by an annular ring 33. The recess 29 terminates within the sleeve 22 at a depth sufficient to leave a small space between the disk 32 and the boss 23. The thicknesses of the disks 31 and 32 are selected to cause rupture at preselected hydrostatic pressures. For a cable 1000 feet long, exemplary pressures may be 500 feet and 1000 feet (waterhead), respectively. The ruptures or implosions of the disks 31 and 32 produce acoustic energy sufficient enough to be detected by a listening sonobuoy separated in the water by a substantial distance.

Operation of the embodiment of FIGS. 1, 2 and 3 should now be apparent. As the probe 10 descends in a deep body of water, thermistors 16 detect the water temperature to produce an output signal from the oscillator 14 in accordance therewith. The cable 13 conducts the oscillator output to a radio transmitter in the flotation device for transmission to a remote receiver. Alternatively, it is contemplated that the temperature measurements be acoustically transmitted through the water to a listening sonobuoy for radio transmission.

When the probe 10 reaches the first of the preselected depths (500 feet in the example), the disk 31 ruptures and produces an acoustic pulse in the surrounding water of sufficient magnitude as to be detected by a listening sonobuoy wherein it is transmitted to a remote receiver. In the alternative, where the probe 10 is acoustically transmitting the temperature measurements through the water to a listening sonobuoy, the same sonobuoy is used for detecting the acoustic pulse.

The probe 10, of course, continues descending, and when it reaches the next preselected depth (1000 feet in the example), disk 32 ruptures generating another acoustic pulse in the water for detection by the listening sonobuoy. These pulses, observable at the remote receiver, can be recorded simultaneously with the temperature information thereby obtaining a positive correlation of depth and temperature. With two depth pulses, it is possible to compute the sink rate of the probe 10 in order to interpolate or extrapolate the depths at any other temperature measurement during descent. Obviously, the inventive embodiment can be used to measure any other condition instead of temperature such as salinity or viscosity; or the unit 21 may be used solely for determining the depth to which any object has descended.

In certain applications, it may be impractical to employ a separate listening sonobuoy, and more desirable to utilize the same transmitting facilities used for temperature or other condition responsive measurements. The embodiment illustrated in FIGS. 4, 5 and 6 demonstrates an extension of the fundamental inventive concepts for accomplishing this technique.

Like in the probe 10 of FIG. 1, an audio oscillator 34 is secured to the lower end of a cylindrical cannister 36 and its output is connected through a cable to a radio transmitter in a buoy at the surface of the water. The oscillator 34 produces an audio signal in accordance with the temperature measured by thermistors 37, shown in dotted outline, contained in respective grills 38. A weight 39 is fixed to the bottom of the oscillator 34 by a hydrostatic unit, indicated generally by the numeral 41, in the same manner as the embodiment of FIGS. 1, 2 and 3. The unit 41 contains two rupturable disks 42 and 43 positioned in the manner described for the hydrostatic unit 21 except that the spaces formed between the disks 42 and 43 and the disk 43 and the oscillator 34 are interposed by eelctrodes 44 and 48 extending radially in toward the center of the unit 41. The electrodes 44 and 48 pass through the unit 41, electrically insulated therefrom, to convenient points whereat they are electrically connected to connectors 46 and 49 extending through watertight openings 47 and 51 in the oscillator 34.

The electrical connections for the electrodes 44 and 48 are best descirbed in connection with FIG. 5 where the thermistors 37 are shown controlling the output frequency of the audio oscillator 34, the latter of which modulates the output of an FM transmitter 52 located in the buoy from which the probe 10 depends. The electrode 44 is connected through a shunt resistor 53 to the output of the oscillator 34, and the electrode 48 is directly connected to the same output. The oscillator 34, transmitter 52 and the hydrostatic unit 41 are electrically grounded. The oscillator output 34 produces a signal of constant amplitude and variable frequency; the frequency being a function of the measured variable such as temperature. When the electrode 44 becomes grounded, the current to the transmitter 52 is decreased. There being a constant input impedance in the transmitter 52, the amplitude of the input signal to the transmitter 52 is abruptly decreased independently of the signal frequency; and when the electrode 48 is grounded the amplitude of the input signal is abruptly decreased to zero. The output of the FM transmitter 52 is accordingly modified.

The manner in which the signal from the transmitter 52 is utilized at a remote receiving station of the present invention is best described in connection with FIG. 6. Here, a receiver 54 detects the radio signal and converts it back to an audio frequency for feeding both a frequency-to-voltage converter 56 and an A.C.-to-D.C. rectifier 57. The output from the converter 56 is a D.C. voltage proportional to the measured temperature. The output of the converter 56 is electrically coupled to a voltage-responsive strip chart recorder 58 for positioning a pen 59 on a chart 61 therein. For readability and assimilation to actual conditions, the chart 61 is transported upwardly at constant speed, as shown by the arrow 62. The output from the rectifier 57 is a D.C. voltage which is a function of the audio frequency amplitude at the input thereto. The rectifier output is connected through a capacitor 63 to the control input of a monostable multivibrator or flip-flop 64 in a manner such that the latter is responsive to negative pulses only. Thus, an increase in the audio signal amplitude to the rectifier 57 increases the D.C. output from the rectifier 57 to produce a positive pulse to the flip-flop 64. Being nonresponsive to positive pulses, the flip-flop 64 will not conduct an output signal. However, when the audio signal amplitude decreases, the D.C. voltage from the rectifier 57 will decrease to produce a negative pulse to the flip-flop 64 causing the latter to conduct an output signal of limited duration. The output signal from the flip-flop 64 is connected through a coupling capacitor 66 with the output from the converter 56 to the recorder input so that the pen 59 will respond to both the variable D.C. voltage from the converter 56 and the pulse output from the flip-flop 64.

Operation of the inventive embodiment in FIGS. 4, 5 and 6 should now be apparent. For a better understanding, the exemplary signal waveforms in FIG. 7 will now be referred to for a typical operation. After the probe becomes immersed in the water at a time $t_0$, temperature measurements begin at time $t_1$ generating the output signal A of constant amplitude and variable frequency. The time interval $t_1-t_0$ allows time for elements of the transmitter 52 to become operational after water immersion, e.g., a sea-activated power supply. The signal A is reproduced at the output of the receiver 54 and then changed into a variable D.C. signal at the output of the converter 56. At time $t_1$, a signal B at the output of the rectifier 57 also produces an increase in D.C. voltage which, in turn, appears in the output signal C of the capacitor 63 as a positive pulse to the flip-flop 64. Being nonconducting on positive pulses, there is no change in the voltage on signal D, and signal E to the recorder 58 is unaffected. The recorder 58 thus produces a temperature signal on the strip chart 61 beginning at the top and identified by point $t_1$.

When the probe reaches the first of the preselected depths (500 feet in the example) at a time $t_2$, the disk 42 ruptures and the sea water flowing into the air space around the electrode 41 completes an electrical circuit parallel to the recorder transmitter input impedance through the resistor 53 to ground. The signal A is thereby abruptly attenuated causing a sharp decrease in the D.C. signal B and consequently a negative pulse in signal C to the flip-flop 64. Being responsive to negative pulses, the flip-flop 64 conducts a D.C. voltage (signal D) of limited duration sufficient to modify the signal E and produce a pip in the time-versus-temperature plot on the chart 61 at time $t_2$.

The probe, of course, continues descending and when it reaches the next preselected depth (1000 feet in the example) at a time $t_3$, disk 43 ruptures and the sea water flows into the space around the electrode 48 to complete a shunt to ground across the output of the oscillator 34.

The amplitude of signal A thereby decreases to zero, and the D.C. voltage from the converter 56 also drops to zero as shown on the chart 61 at time $t_3$. With the depths (500 and 1000 feet) and their respective times $t_2$ and $t_3$ now known, the sink rate may be precisely determined and then the exact depth at $t_1$ can be extrapolated in order to obtain a precise depth-versus-temperature correlation throughout the entire descent of the probe. Like in the first described embodiment, this inventive embodiment can also be used to measure any other condition instead of temperature, or may be used solely for determining depth.

Some of the many advantages of the present invention should now be readily apparent. For example, a novel and very simple depth measuring probe is now available for either cable-lowered or free-sinking devices by which the depth during descent can be measured and transmitted. Distinct acoustical signals can be generated at any preselected depths and used for correlating synoptic measurements by a probe of an ambient condition, such as temperature, throughout descent. The invention also affords an extremely simple and inexpensive depth-measuring probe having a wide variety of applications such as in aircraft-launched bathythermographs.

It will be understood, of course, that various changes in the details, materials, steps and arrangement of parts which have been herein described and illustrated in order to explain the nature of the invention, may be made by those skilled in the art within the principle and scope of the invention as expressed in the appended claims.

What is claimed is:

1. Apparatus for determining the depth during descent of a probe in a body of water, comprising:
 a nonbuoyant member;
 pressure responsive means carried by said member for transmitting a signal, said means including a first diaphragm rupturable at a pre-selected depth, exposed on one side to the surrounding water and on the other side to a confined air space;
 a first electrode positioned in said air space, and electrically insulated from said member whereby the rupture of said first diaphragm causes said first electrode to modify the transmitted signal from said pressure responsive means.

2. Apparatus as defined in claim 1 further comprising:
 condition responsive means carried by said member for transmitting signals indicative of a water condition throughout the descent, said pressure responsive means modifying the signals from said condition responsive means.

3. Apparatus as defined in claim 2 wherein said condition responsive means further comprises:
 temperature sensing means; and
 oscillator means having an input connected to the output of said sensing means for producing an audio signal indicative of the water temperature.

4. Apparatus as defined in claim 3 wherein said pressure responsive means comprise:
 a second diaphragm having one side exposed to said confined air space and the other side thereof confined to another confined air space, said second diaphragm being rupturable at a higher pre-selected pressure than said first diaphragm;
 a second electrode positioned in said other confined airspace; and
 means electrically connecting said second electrode directly to the output of said oscillator.

5. Apparatus as defined in claim 1 wherein said first diaphragm is composed of a suddenly rupturable material whereby an acoustical signal is generated in the surrounding water sufficient to be detected by a listening sonobuoy located at a substantially remote distance therefrom.

6. Apparatus as set forth in claim 3 wherein said first diaphragm is composed of a suddenly rupturable material whereby an acoustical signal is generated in the surrounding water sufficient to be detected by a listening sonobuoy located at a substantially remote distance therefrom.

7. Apparatus as defined in claim 4 wherein said first and second diaphragms are composed of a suddenly rupturable material whereby sequential acoustical signals are generated in the surrounding water sufficient to be detected by a listening sonobuoy located at a substantially remote distance therefrom.

8. Apparatus for determining the depth during descent of a probe in a body of water comprising:
 a non-buoyant member;
 pressure responsive means carried by said member for transmitting a signal, said means including a diaphragm rupturable at a pre-selected depth, exposed on one side to the surrounding water and on the other to a confined air space;
 an audio oscillator carried by said member for generating a constant amplitude alternating current signal at the output thereof;
 a radio transmitter adapted to float on the surface of the water;
 means for connecting the output of said oscillator to the input of said transmitter;
 an electrode positioned in said air space; and
 means electrically connecting said electrode to the output of said oscillator.

9. Apparatus as defined in claim 8 further comprising a remote receiving station which includes:
 a radio receiver for converting the signal received from said transmitter to an audio signal at the output thereof;
 a frequency-to-voltage converter having an input connected to the output of said of said receiver for producing a voltage on the output thereof indicative of frequency;
 a rectifier having an input connected to the output of said receiver for producing a voltage at the output thereof indicative of the amplitude of the input signal;
 a monostable multivibrator having an output conductive in response to a negative input signal;
 a capacitor electrically connected between the output of said rectifier and the input to said multivibrator;
 a recorder having a strip chart transportable at constant speed and a recording pen responsive to a voltage input;
 means electrically connecting the outputs from said converter and said multivibrator to the voltage input of said recorder.

10. Apparatus for determining the depth during descent of a probe in a body of water, comprising:
 a non-buoyant member;
 a first diaphragm rupturable at a pre-selected depth, exposed on one side to the surrounding water and on the other side to a confined air space;
 a second diaphragm having one side exposed to said confined air space and the other side thereof confined to another confined air space, said second diaphragm being rupturable at a higher pre-selected pressure than said first diaphragm;
 an audio oscillator carried by said member for generating a constant amplitude alternating current signal at the output thereof;
 a radio transmitter adapted to float on the surface of the water;
 means for conducting the output of said oscillator to the input of said transmitter;
 a first electrode positioned in said first-mentioned air space;
 a second electrode positioned in said second-mentioned air space;
 impedance means electrically connected between the output of said oscillator and said first electrode;

and means electrically connecting said second electrode directly to the output of said oscillator.

References Cited by the Examiner

UNITED STATES PATENTS

| | | | |
|---|---|---|---|
| 2,520,814 | 8/1950 | Rule | 340—4 X |
| 2,568,712 | 9/1951 | Bowersett et al. | 107—7 |
| 3,098,993 | 7/1963 | Coop | 340—5 |
| 3,148,618 | 9/1964 | Richard | 340—5 X |

CHESTER L. JUSTUS, *Primary Examiner.*

LEWIS H. MEYERS, *Examiner.*

R. A. FARLEY, *Assistant Examiner.*